Jan. 1, 1963 H. F. HOBBS 3,071,025
POWER TRANSMISSION APPARATUS
Filed May 15, 1961
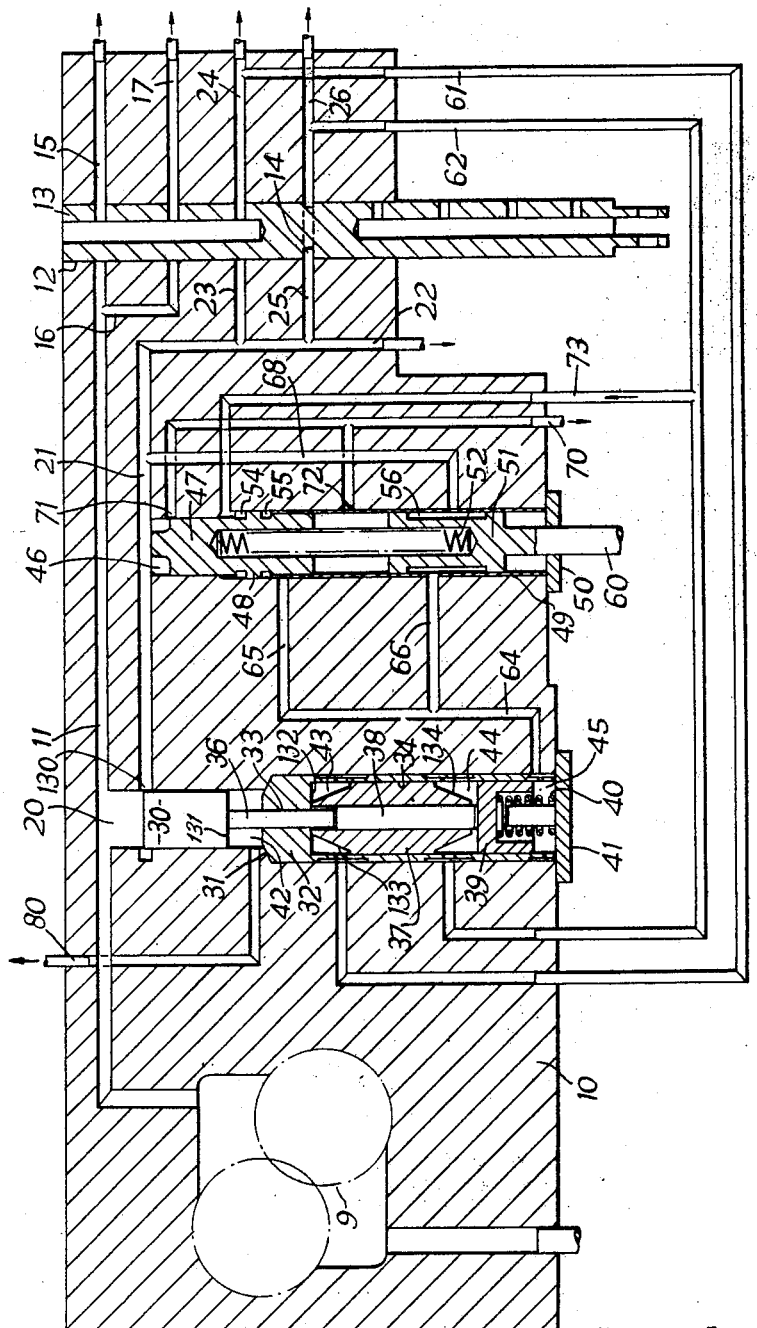
INVENTOR
HOWARD FREDERICK HOBBS
BY
Irwin S. Thompson
ATTORNEY United States Patent Office 3,071,025
Patented Jan. 1, 1963

3,071,025
POWER TRANSMISSION APPARATUS
Howard F. Hobbs, Leamington Spa, England, assignor to Hobbs Transmission Limited, Leamington Spa, England
Filed May 15, 1961, Ser. No. 110,168
Claims priority, application Great Britain June 24, 1960
2 Claims. (Cl. 74—763)

This invention relates to power transmission apparatus of the kind in which changes of ratio are made by engagement and disengagement of two or more friction engaging devices (clutches and/or brakes) and which incorporates a pump and at least two relief valves to control the pressure delivered by the pump, which is pressure directed to the different friction engaging devices to produce engagement. In apparatus of this kind it is usual to have at least two oil circuits at different pressures as the torques to be carried by the different clutches and brakes will not be the same. This arrangement has the disadvantage that the circuit carrying the higher pressure is maintained at the higher pressure even when the clutches or brakes connected to this circuit are not in use. This has two disadvantages viz (1) the pump supplying the pressure is caused to work at a higher pressure than necessary over a substantial proportion of its time of operation and (2) an unnecessarily high load is applied to various of the valves in the circuit which often has the effect of increasing an undesirable crossbinding effect.

According to the invention, the apparatus includes a first relief valve and a second relief valve arranged to maintain two levels of pressure at the same time in two channels that supply pressure to different friction engaging devices and means whereby when the higher pressure provided by the first relief valve is not required it is automatically reduced to the lower level maintained by the second relief valve. The second relief valve may be connected with a throttle actuating member (e.g. the accelerator pedal of a motor car) so that the pressures maintained by both valves will vary in accordance with the position of the throttle actuating member, i.e. the pressures will be higher when the throttle is open and the torque delivered by the engine driving the power transmission is greater.

A constructional form of the invention will now be described with reference to the accompanying diagrammatic drawing which is a sectional view of a device made in accordance with the invention.

This constructional form is suitable for use in a gear such as is shown and described in the specification of United States Patent 2,825,245 having a main clutch A which is engaged in all forward gears (1st, 2nd, 3rd and top), top gear (and reverse) clutch B, and reaction brakes C, D, and E for holding appropriate parts of an epicyclic gearing to produce the required gear ratios.

A block 10 contains a pump 9 which supplies liquid under pressure to a first circuit comprising a channel 11 which leads to a selector valve bore 12 that contains a selector valve 13 which has an annular groove 14 which in one position connects the channel 11 to a duct 15 which leads to the reaction brake which is engaged for providing first gear in which the high torques require a higher engaging pressure than is necessary for example in top gear.

A duct 16 leads from channel 11 to another part of the valve bore 12 which can be connected by channel 14 to a duct 17 which leads to the reaction brake for second gear.

The block 10 contains a second circuit comprising a channel 21 connected with the channel 11 by a valve bore 20, and connected by ducts 22, 23 to bore 12 which can be connected by groove 14 to duct 24 which in turn is connected to the third gear reaction brake. Duct 22 is also connected to the main clutch (e.g. clutch A of U.S. Patent 2,825,245). Channel 22 also has a duct 25 leading to the bore 12 which can be connected by groove 14 to a duct 26 which leads to the top gear clutch.

The bore 20 contains a high pressure relief valve piston 30 which controls relief of pressure from the first circuit 11 to the second circuit 21 and acts to open and close the end or port 130 of the channel 21. The bore 20 is stepped to provide a shoulder 31 against which is located one end of a sleeve 32 which in affect forms part of the bore whereby the bore has a part 33 of a smaller diameter and a part 34 of a larger diameter. The piston 30 maintains a required high pressure in the channel 11.

The piston 30 is in contact with a pin 36 which passes through the head of the sleeve 32. The pin 36 contacts a pin 38 of enlarged diameter, which carries a second piston 37 which is slidable on the pin. The pin 38 contacts a third piston 39 and a helical compression spring 40 is located between this piston and a cover 41 which closes the end of the bore.

Spaces 42, 43, 44, 45 are provided in the bore. The space 42 is provided adjacent the inner end 131 of the piston 30. The space 43 is disposed between the end 132 of the larger part of the bore and the adjacent end surface 133 of the sliding piston 37. The space 44 is disposed between the other end surface 134 of the piston 37 and the piston 39.

A second or low pressure relief valve is located in a stepped bore 46 in the block 10 and comprises a stepped relief valve piston 47 having an annular flange 48 of larger diameter acting in the larger part of the bore. The piston 47 serves to maintain a required pressure in the channel 21 lower than is required in first and second gear in the channel 11. The bore contains a sleeve 49 thus providing in effect a bore having two parts of smaller diameter on opposite sides of the part of larger diameter. This bore is closed by a cover plate 50. A second piston 51 is located in the sleeve 49 and a helical compression spring 52 acts between the pistons 47, 51.

The valve piston 47 has grooves 54, 55 and the valve piston 51 has a port or groove 56.

The piston 51 is connected by a pin 60 to a throttle actuating member (e.g. the accelerator pedal of a motor vehicle).

A duct 61 leads from duct 24 through openings in the sleeve 32 to space 43 and a duct 62 leads from duct 26 through other openings in the sleeve 32 to space 44. A duct 64 connects at one end with the space 45 and at the other end has branches 65, 66 connecting with the bore 46 at 55, 56 respectively.

A duct 68 connects the channel 21 with the bore 46 at grooves 56 whereby the channel 66, 64 receives pressure at all times except when the throttle actuated pin 60 is in fully throttle-closed position when the piston 51 closes the channel 66.

An exhaust duct 70 is connected to a port 71 controlled by piston 47 for relieving pressure from the channel 21. The exhaust duct 70 also connects to port 72 between the pistons 47, 51.

The duct 62 also connects to the bore 46 at groove 54 by way of duct 73.

The relief valve 47 is urged towards the shut position by spring 52 and the pressure in channel 21 is dependent on the position of the rod 60 and the compression and load on the spring 52. Except when the throttle actuated pin 60 is in fully throttle closed position pressure is led from the channel 68 through the groove 56 to the channels 66 and 65 and to the space 55 so that the pressure acts on the exposed portion of the valve at 48 thereby assisting the spring. When pressure is applied to the channel 26, for engagement of direct drive, less pressure is required and pressure in the channel 26 is fed by means of channels 62 and 73 to the space 54. This pressure acts in opposition to the spring 52, thereby reducing pressure.

A duct 80 is connected to exhaust or to a port of the selector valve and supplies pressure to the space 42 on the under side of the piston 30.

The operation of the new device is as follows:

The pump 9 delivers oil to the first circuit (channel 11), pressure in which is controlled by the first relief valve 30. The pressure produced is in accordance with the load from the spring 40 and the pressure from the duct 64. This pressure is led to the first and second gear brakes through the ducts 15, 17. The pressure required is relatively high. The duct 24 leads from the second circuit and operates the third gear brake but the pressure required is low. When this brake is in operation it is not required to engage the other brakes. Pressure in the duct 61 acts on the piston 37 which slides on rod 38 and engages the piston 39 thereby relieving the load on the piston 30 and reducing pressure in the first circuit. Similarly when the top gear clutch is engaged by pressure in the duct 26, this pressure is led by the duct 62 to the space 44 and acts on the piston 39 thereby again reducing the load on the piston 30 and pressure in the first circuit. The pump 9 therefore operates for the greater part of the time against the pressure required in the second circuit and not against the much higher pressure required for the first circuit.

The springs and piston sizes are designed so that in effect when pressure is admitted to space 43 or 44, the valve 30 can be repressed by a pressure no greater than that required to repress piston 47.

The pressure from the first circuit acting on the selector valve 13 tends to cause cross binding no matter how carefully the valve is balanced and the reduction in the pressure allows the valve 13 to move more freely and to provide improved operation.

The duct 73 feeds pressure from the second circuit to the groove 54 thereby acting on the valve piston 47 against the spring 52 thereby reducing the pressure in the second circuit during top gear.

The duct 80 leads to exhaust.

I claim:

1. In a power transmission apparatus having: input clutch means, an epicyclic gearing connected wtih said clutch means, an output shaft connected with said epicyclic gearing, a second clutch means and at least three fluid pressure operated reaction brakes acting on parts of said epicyclic gearing; the combination of a pump supplying fluid pressure, a first fluid pressure circuit (11) receiving fluid pressure from said pump, a second fluid pressure circuit (21–23 and 25), a selector valve (13) connected with said first and second circuits, four output channels (15, 17, 24, 26) from said valve (13) leading respectively to said brakes and second clutch means (26), said valve connecting said first circuit with the first and second output channels in two positions, respectively, of the valve, connecting the second circuit with the third output channel (24) in another position of the valve and connecting the second circuit with the fourth output channel (26) in a further position of the valve; a relief valve (30) admitting fluid pressure from the first circuit (11) to the second circuit (21), said relief valve including a valve cylinder, first (37) and second (39) pistons in said cylinder, means (36, 38) operatively connected between said second piston and relief valve whereby pressure on the second piston acts on the relief valve (30), spring means (40) urging said second piston towards the relief valve, a first control channel (61) connecting the third output channel (24) with the end of the first piston (37) remote from the second piston (39), a second control channel (62) connecting the fourth output channel with a space (44) between the first and second pistons, whereby when the first circuit supplies fluid pressure to the first or second output channels (15, 17) no fluid pressure is supplied to the control channels, when the second circuit supplies fluid pressure to the third output channel fluid pressure is supplied to the first control channel to act against the spring means and relieve pressure on the relief valve to reduce the output pressure of the pump, and when the second circuit is connected to the fourth output channel fluid pressure is supplied to the second control channel to likewise relieve pressure on the relief valve.

2. A power transmission apparatus as claimed in claim 1. The combination further comprising a second valve cylinder, an exhaust valve piston (47) operating in said second valve cylinder, said exhaust valve piston controlling exhaust from said second circuit, a spring device (52) acting on said exhaust valve piston, a first connecting channel (66, 64) from said second valve cylinder to said second piston (39) to supply fluid pressure on the latter in assistance to said spring means (40), a second connecting channel (68) from said second circuit (21) to said second valve cylinder, an operator controlled valve (51) in said second valve cylinder for effecting communication of fluid pressure from the second connecting channel (68) to the first connecting channel (66), and a third connecting channel (73) from said second control channel (62) to said exhaust valve piston to supply fluid pressure to the latter acting against said spring device (52).

References Cited in the file of this patent

UNITED STATES PATENTS

| | | |
|---|---|---|
| 2,863,327 | Hobbs | Dec. 9, 1958 |
| 2,887,198 | Hobbs | May 19, 1959 |